United States Patent [19]

Chan et al.

[11] Patent Number: 5,416,778
[45] Date of Patent: May 16, 1995

[54] DIGITAL RADIO COMMUNICATION SYSTEM AND PRIMARY AND SECONDARY STATION FOR USE IN SUCH A SYSTEM

[75] Inventors: Kar B. Chan; Cornelis C. M. Schuur; Roelof J. H. De Haas, all of Eindhoven, Netherlands

[73] Assignee: U.S. Philips Corporation, New York, N.Y.

[21] Appl. No.: 72,196

[22] Filed: Jun. 3, 1993

[30] Foreign Application Priority Data

Jun. 26, 1992 [EP] European Pat. Off. ............ 92201896

[51] Int. Cl.$^6$ ................................................ H04J 3/16
[52] U.S. Cl. .................................. 370/95.1; 370/953; 370/50
[58] Field of Search ............... 455/33.1, 33.2, 33.4, 455/36.1, 36.2; 375/1; 370/95.1, 95.3, 79, 80, 111, 50, 66, 68, 68.1, 105.3, 84

[56] References Cited

U.S. PATENT DOCUMENTS 4,535,446 8/1985 Mountain .......................... 370/84
5,134,615 7/1992 Freeburg et al. ................. 370/95.3

OTHER PUBLICATIONS

R. J. Mulder, DECT, a universal cordless access system, Philips Telecommunications Review, vol. 49, No. 3, Sep. 91, p. 68–73.
W. H. W. Tuttlebee, Cordless Telecommications in Europe, 1990, pp. 198–206, 209–227 and 273–284.

Primary Examiner—Douglas W. Olms
Assistant Examiner—Huy D. Vu
Attorney, Agent, or Firm—Leroy Eason

[57] ABSTRACT

A digital radio communication system (1) is known, for example based on the DECT standard, in which radio communication of digital speech or data between primary (BS1) and secondary (MS1) stations takes place via duplex FDMA/TDMA connection. Channel allocation therein is dynamic. If necessary because of the receiving conditions, the secondary station (MS1) can initiate a so-called handover by searching for a free channel offering better receiving conditions. In accordance with the invention, this handover is seamless. Digital speech bursts are exchanged via different time slots (ts) during a number of frames (fr), these being digital speech data and copy digital speech data. After verification that the copy data is valid, i.e. that communication has been established via a free channel, handover takes place. The original data and the copy data are stored in a cyclic buffer (SB5) so that the phase shift (d) between the original data and the copy data is eliminated. Subsequently, the channel via which the original data was transported is released. In one embodiment a speech pointer (SPP) for reading speech freely progresses along the cyclic buffer (SB5) and a radio pointer (RFP), progressing along the buffer (SB5) and controlling the writing of speech bursts, is adapted during handover to the phase shift (d) between time slots involved in the handover.

9 Claims, 4 Drawing Sheets

DIGITAL RADIO COMMUNICATION SYSTEM AND PRIMARY AND SECONDARY STATION FOR USE IN SUCH A SYSTEM

BACKGROUND OF THE INVENTION

1. Field of the Invention

The invention relates to a digital radio communication system, comprising at least one primary station and at least one secondary station, which stations exchange digital data in at least one time slot of a time multiplex frame via at least one frequency channel, the primary station and/or the secondary station comprising control means which are capable of replacing a first time-slot/-frequency-channel combination allocated to data exchange by a second time-slot/frequency-channel combination.

The invention also relates to a primary and a secondary station for use in such a system.

2. Description of the Related Art

A digital radio communication system of this kind is known from an article in Philips Telecommunication Review "DECT, a universal cordless access system", Vol. 49, No. 3, September 1991, pp. 68-73. In the known system digital data is exchanged, for example in the form of digital coded speech or data, between a primary DECT station (DECT, Digital European Cordless Telecommunication standard), being a so-called base station, and a secondary station, being a so-called handset. In DECT, being a cordless telephony system based on a cellular concept, there are 10 frequency channels via which radio communication takes place, in principle in the duplex mode in time slot pairs, between the base station and the handset. In DECT, per DECT-TDMA frame of 10 ms there are defined 24 time slots, i.e. 12 for radio traffic from the base station to the handset and 12 for radio traffic from the handset to the base station, said time slots forming 12 time slot pairs for each frequency channel. Consequently, there are 120 duplex time-slots/frequency-channel combinations or 120 channels in DECT. In a system such as DECT, in which the physical network layer implements an FDMA/TDMA/TDD radio transmission, the channel allocation is dynamic, i.e. if channels are required for radio communication, they are dynamically allocated from a set of available channels and, after termination of the communication, they are returned to the set of available channels. Furthermore, because of the frequently changing receiving conditions, a comparatively large number of so-called "handovers" occurs, i.e. the switching over of a radio communication in progress via a given channel to another channel. In the case of interference, such a handover may be intra-cellular or also, when the handset leaves the range of the base station, inter-cellular. The handover, taking place, for example in the event of a poor transmission quality, is initiated by the handset or the portable set in DECT. The DECT standard calls for such a handover to be seamless, i.e. so that a user of DECT does not notice the transition from a first time-slot/frequency-channel combination to a second time-slot/frequency-channel combination since radio communication is allowed via two different time slot pairs for a number of frames, but the cited standard does not make an implementation proposal.

SUMMARY OF THE INVENTION

It is an object of the present invention to provide a digital radio communication system of the kind set forth in which handover is truly seamless.

A digital radio communication system in accordance with the invention is characterized in that the system is adapted to exchange, during replacement of a first time-slot/frequency-channel combination by a second time-slot/frequency-channel combination, also a copy of the data in the second time-slot/frequency-channel combination during at least one time multiplex frame in order to store, after verification of the validity of the copy data, the data and the copy data in a cyclic buffer so that a phase shift between the data and the copy data is eliminated, and to release subsequently the first time-slot/frequency-channel combination. The truly seamless handover is achieved by ensuring, upon a channel transition, that the common information in data and the copy data overlap in the cyclic buffer and that the non-overlapping, most recent information of the copy data fills the remainder of the cyclic buffer at the instant at which validity of the copy data is detected during a handshaking procedure.

An embodiment of a digital radio communication system in accordance with the invention is characterized in that the digital data represents compressed digital speech, the system comprising a first pointer which controls the filling/reading of the cyclic buffer with compressed speech data, and a second pointer which controls the reading/filling of the cyclic buffer at a substantially lower speed. During filling/reading of the cyclic buffer with compressed speech data and compressed copy speech data the first pointer is always positioned on the cyclic buffer so that the cyclic buffer is filled/read with the most recent speech. Upon reception of data and copy data, the cyclic buffer is always filled with a so-called burst of data at a comparatively high speed. The first pointer, controlling the write process, is then positioned on that location in the cyclic buffer wherefrom the next data is fetched by the second pointer, which controls the comparatively slow read process and which in principle progresses freely along the cyclic buffer, i.e. cyclically along the buffer at a constant speed. For each time slot the necessary phase shift of the first pointer is stored in a table in the cyclic buffer and the position of the first pointer on the cyclic buffer is adapted in accordance with the relevant phase shift upon handover of time-slot/frequency-channel combinations. In the transmission direction, in a duplex connection, transmission always takes place via two time-slot/frequency-channel combinations during handover. The first and the second pointer may then be considered to be quantities which vary in the form of a sawtooth, a condition then being that the comparatively fast first pointer may not cross or overtake the comparatively slow second pointer, so as to enable seamless handover. The advantage of a seamless handover consists in that the user during a digital speech connection absolutely does not notice the handover, whereas for a data connection it is achieved that no data is lost.

A further embodiment of a digital radio communication system in accordance with the invention is characterized in that the primary station comprises delay time determining means for determining a propagation time between transmission by a primary station and reception by a secondary station, the primary station correcting the phase shift by way of the propagation time determined. A seamless handover can thus also be achieved in the event of large distances between the primary station and the secondary station.

A further embodiment of a digital radio communication system in accordance with the invention is characterized in that the secondary station comprises signal strength measuring means for measuring the signal strength of a radio signal modulated with the digital data, the control means replacing, on the basis of a signal strength of the radio signal measured by the signal strength measuring means, a time-slot/frequency-channel combination allocated during data exchange by a different time-slot/frequency combination. As a result, in the event of a change in receiving conditions a handover initiated by the handset can take place.

BRIEF DESCRIPTION OF THE DRAWINGS

The invention will be described in detail hereinafter with reference to the drawings; therein

DESCRIPTION OF THE PREFERRED EMBODIMENTS

Figure 1:
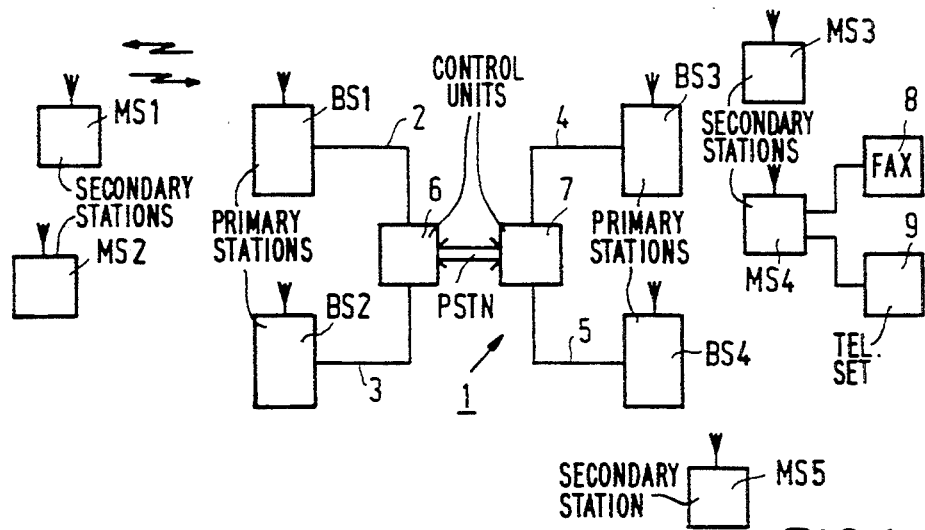
FIG. 1 shows diagrammatically a digital radio communication system in accordance with the invention.

FIG. 1 shows diagrammatically a digital radio communication system 1 in accordance with the invention. The system 1 comprises a number of primary or base stations BS1, BS2, BS3 and BS4. Each primary station BS1, BS2, BS3 and BS4 is connected to control devices for cordless telephony 6 and 7 via respective wide band fixed connections 2, 3, 4 and 5 capable of transporting digital data. The control devices 6 and 7 may be connected to the public telephone system PSTN. The system 1 also comprises a number of secondary stations or mobile stations, such as a handset, MS1, MS2, MS3, MS4 and MS5 which can serve for digital speech connections or data connections via radio communication, with or without a duplex connection. A secondary station may also be a so-called CTA (Cordless Terminal Adapter) whereto further equipment is coupled, for example a facsimile apparatus 8 and a telephone set 9. When the digital radio communication system 1 complies with, for example the DECT (Digital European Cordless Telecommunications) standard, the digital speech connection will be an FDMA/TDMA/TTD connection. Other connections, however, are also possible. The construction of the digital radio communication system 1 may be based on a microcellular concept, for example as defined in the DECT standard. Inter alia in DECT the radio communication from primary to secondary stations takes place via time-slot/frequency-channel combinations, i.e. via time slots in transmission frames which are transported via dynamically allocated frequency channels. In order to enable radio communication, the primary and secondary stations BS1, BS2, BS3 and BS4 and MS1, MS2, MS3, MS4 and MS5 comprise transmission/receiving means as usual. In this respect reference is made to the cited article in Philips Telecommunication Review, Vol. 49, No. 3, September 1991, pp. 68–73, for different system configurations within the DECT standard. In a time dimension duplex (TDD) connection as established in conformity with the DECT standard, per frequency channel 12 time slots are reserved for communication from the primary to the secondary station and 12 time slots are reserved for communication from the secondary station to the primary station. A complete frame comprising 24 time slots then has a duration of 10 ms. In the case of digitized speech, 80 speech samples are transported per time slot, i.e. 80 nibbles of digitized speech dam, in DECT ADPCM coded speech of 32 kbit/s. In DECT the duplex speech connection consists of a time slot pair in a frame and channel allocation is dynamic. For a data connection time slots can be combined in a frame if higher transmission speeds are required. For further details of DECT, inter alia concerning the establishment of connections, reference is made to the DECT standard and to the handbook "Cordless Telecommunications in Europe", W. H. W. Tuttlebee, Springer-Verlag, 1990, pp. 198–206, and for implementation of a digital radio communication system reference is made to pages 209–227 of the cited handbook. Appendix 3, pp. 273–284 of this handbook contains a summary of the DECT standard and inter alia shows the protocol layer structure of DECT in conjunction with the standard OSI network layer structure. In DECT the so-called MAC (Medium Access Control) protocol layer, being defined above the so-called "physical layer", provides the establishment of physical connections, i.e. the establishment, maintenance and release of physical channels. The so-called MGE (Management Entity), controlling the lower four DECT layers, inter alia takes decisions in respect of initiating a handover when the quality of the radio connection is no longer adequate.

Figure 2A:
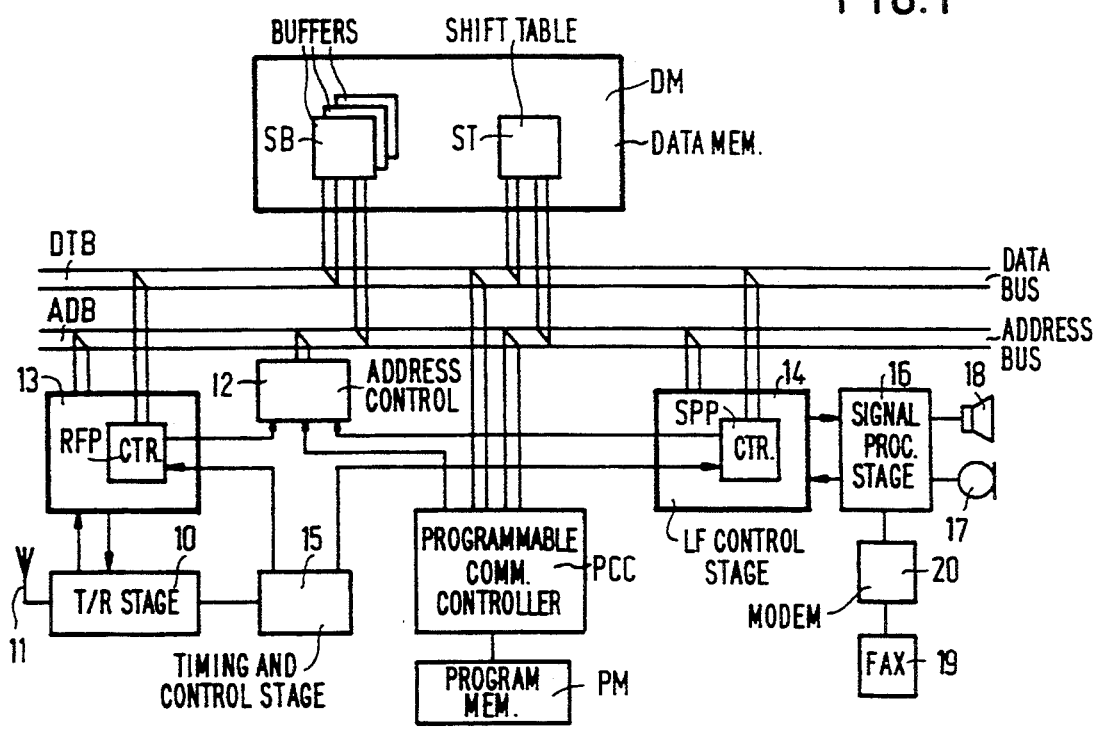
FIG. 2A shows diagrammatically a station for use in a digital radio communication system in accordance with the invention.

FIG. 2A shows diagrammatically a station for use in a digital radio communication system 1 in accordance with the invention. The station comprises a transmission/receiving means stage 10 for transmitting/receiving a radio signal modulated with digital data via an aerial 11, and also control means which are capable of replacing a first time-slot/frequency-channel combination allocated to data exchange by a second time-slot/frequency channel combination in a manner yet to be described. The control means comprise a Programmable Communication Controller PCC which is coupled to an address bus ADB and a data bus DTB, a program memory PM for storing a control program, an address multiplexer/bus controller 12, and a data memory DM. For handover in accordance with the invention, the control means also comprise buffers SB and a shift table ST in the data memory DM, an RF control stage 13 which is coupled to the address bus ADB and the data bus DTB and to the transmission/receiving stage 10 and which comprises a modulo-80 counter or first pointer RFP, an LF control stage 14 which is coupled to the address bus ADB and the data bus DTB and which comprises a modulo-80 counter or second pointer SPP, and a timing and control stage 15 which is driven by the transmission/receiving stage 10 so as to control the modulo-80 counters RFP and SPP. In the present embodiment, the pointers RFP and SPP are proportioned in conformity with the data bursts of 80 speech samples to be exchanged via the time-slot/frequency-channel combinations in the case of digitized speech. When different numbers of samples or data are used, the pointers are adapted accordingly. In accordance with the invention, the first pointer RFP is loaded with an initial value, stored in the shift table ST, by the Programmable Communication Controller PCC, after which it is started by the Timing & Control stage 15, the second pointer SPP progressing independently, initiated by the Timing & Control stage 15. The operation of the seamless handover mechanism will be described in detail hereinafter with reference to the FIGS. 3 to 6. When the station is a secondary station, it also comprises a signal processing stage 16 which is coupled to the LF control stage 14 and which comprises as usual A/D and D/A converters and a CODEC for convening and (de)coding speech into digitized speech and vice versa. For speech a microphone 17 and a loudspeaker or other acoustic converter 18 are coupled to the signal processing stage 16, and for data, for example a Facsimile apparatus 19 is coupled thereto via a modem 20. When the station is a primary station, the LF control stage 14 is coupled in a customary manner to signal units of the primary station (not shown).

Figure 2B:
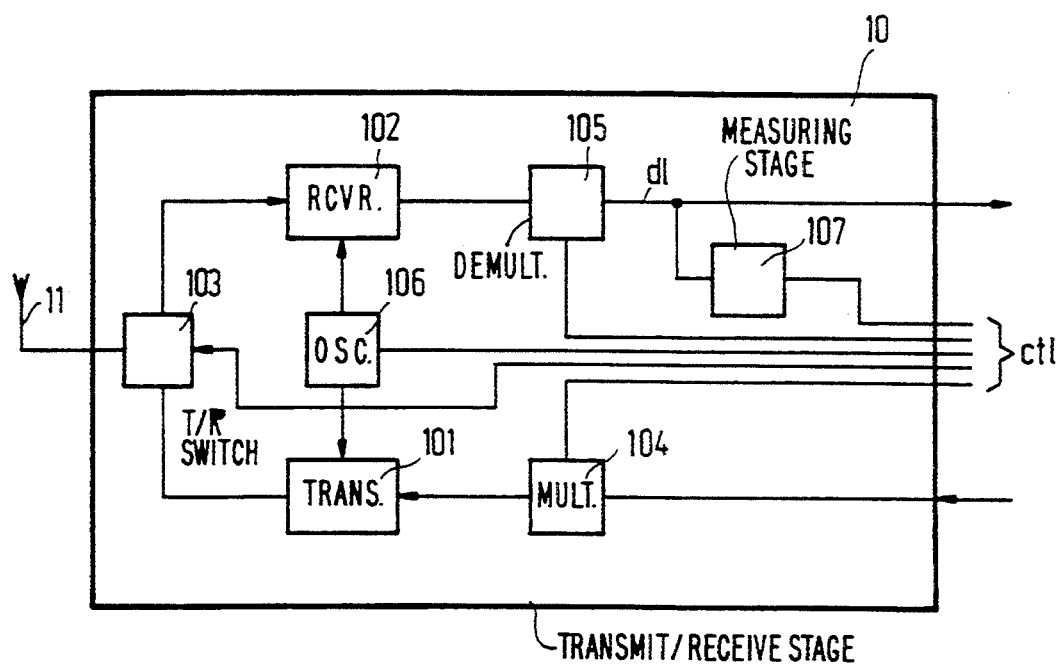
FIG. 2B shows transmission/receiving means in a primary or a secondary station.

FIG. 2B shows the transmission/receiving stage 10 in the primary or the secondary station. The transmission/receiving stage 10 comprise a transmitter 101 and a receiver 102 for transmitting and receiving, respectively, a radio signal, modulated with digital data, via the aerial 11. The transmission/receiving stage 10 also comprise a transmission/reception switch 103 for switching over from transmission to reception and vice versa. Via a multiplexer 104, the transmitter 101 is coupled to the RF control stage 13 of FIG. 2A, the receiver 102 being coupled to the RF control stage 13 via a demultiplexer 105. The multiplexer 104 and the demultiplexer 105 add control and synchronization information to data streams or remove this information from the data streams. For the sake of simplicity, only data lines are shown. For a description of multiplexing of logic signals in physical channels in DECT, reference is made to pages 280–281 of the cited handbook by Tuttlebee. The transmission/receiving frequency can be varied by varying the frequency of a local oscillator 106 which is coupled to the transmitter 101 and the receiver 102. The transmission/reception switch 103, the multiplexer 104, the demultiplexer 105, and the local oscillator 106 can be driven by the Programmable Communication Controller PCC, via control lines ctl. When the station is a secondary station, the transmission/receiving means 10 also comprise signal strength measuring stage 107 which are coupled to a data line dl of the demultiplexer 105 and which supply the PCC with information concerning the signal strength of radio signals received via a given frequency channel. On the basis of various signal strength measurements, a control program stored in the program memory PM as shown in FIG. 2A can decide when to perform a handover. When the station is a primary station, it comprises delay time determining means for determining a propagation time between transmission by a primary station and reception by a secondary station. The delay time determining means, formed by a program section in the primary station in the program memory PM, can determine the propagation time as follows. After a radio connection has been established on a free channel via a time-slot/frequency-channel combination, i.e. the secondary station is synchronized with the primary station, the primary station receives data from the secondary station in a given time slot. In the synchronized state, in the case of a propagation time zero the primary station knows when it should receive the data. The primary station determines the propagation time on the basis of the difference between the actual instant of reception of the data in the relevant time slot, in the case of a propagation time not equal to zero, and the known instant of reception with a propagation time zero. In the synchronized state the primary station can also transmit a test signal in order to determine the propagation time. When this test signal is returned immediately by the secondary station in a corresponding time slot, for example in DECT, the primary station receives the returned test signal 5 ms + two times the propagation time later than the instant of its transmission by the station itself, so that the primary station can determine the propagation time therefrom.

Figure 3:
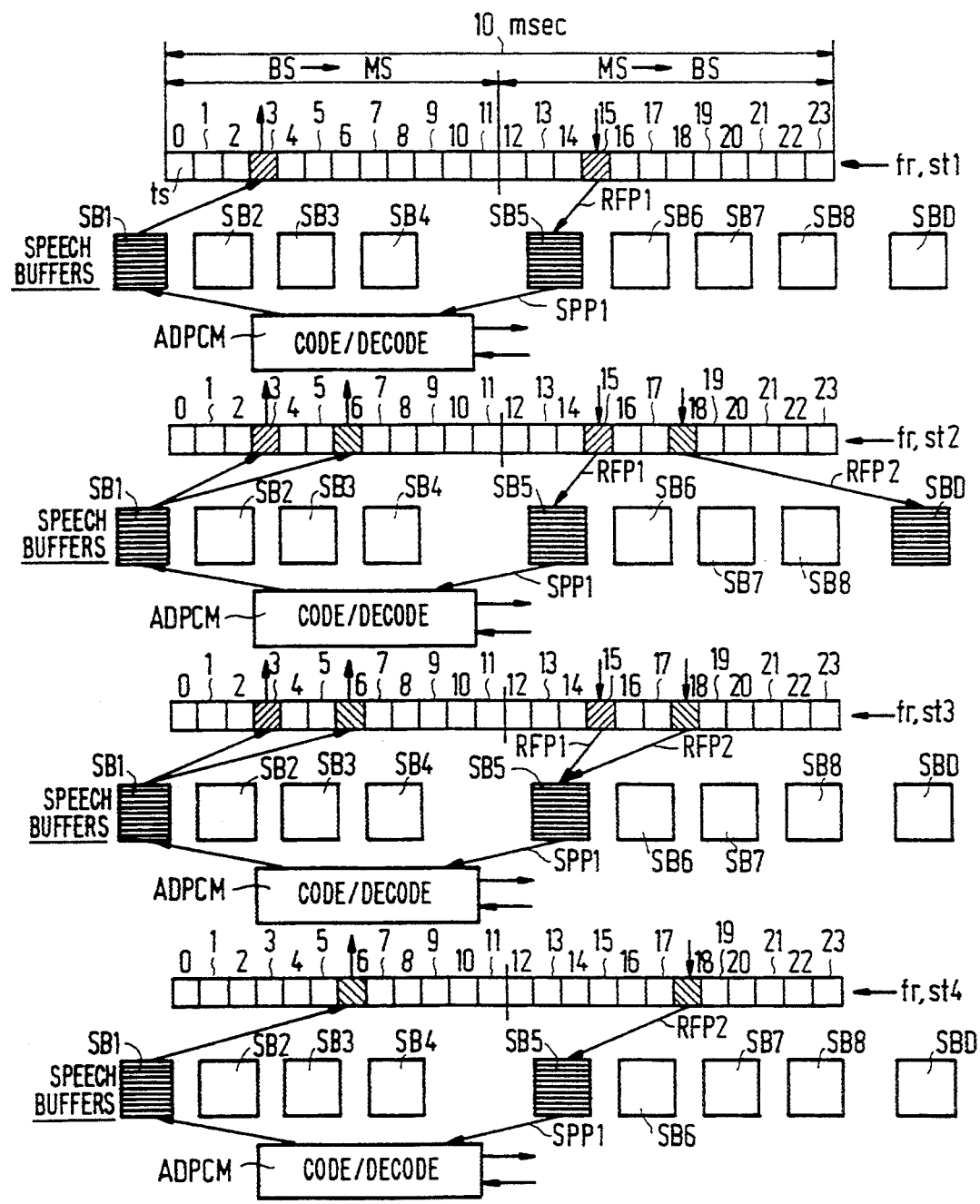
FIG. 3 shows step-wise handover in accordance with the invention.

FIG. 3 step-wise illustrates handover in accordance with the invention. The Figure shows a frame fr having a duration of 10 ms and comprising 12 time slots ts for communication from a primary station BS to a secondary station MS, BS→MS, and 12 time slots for communication from the secondary station MS to the primary station BS, MS→BS, successively in states st1, st2, st3 and st4, denoted by fr, st1; fr, st2; fr, st3; and fr, st4. The frame sequence fr, st1; fr, st2; fr, st3; and fr, st4 represents replacement of a first time-slot/frequency-channel combination (time slot pair 3, 15) by a second time-slot/frequency-channel combination (time slot pair 6, 18), with handover in accordance with the invention. Per time slot, 320 information bits can be transmitted in DECT. The time slots ts are numbered from 0 to 23. Also shown are speech buffers SB1 to SB8 and a dummy speech buffer SBD which form part of the data memory DM as shown in FIG. 2A, and also a first or radio pointer RFP1 and a second or speech pointer SPP1. The first pointer RFP1, being a modulo-80 counter, points to a location in the cyclic speech buffer SB5, and the second pointer SPP1, also being a modulo-80 counter, points to a different location in the cyclic speech buffer SB5. Also shown is an ADPCM (Adaptive Differential Pulse Code Modulation) stage which forms part of the signal processing stage 16 shown in FIG. 2A. The ADPCM stage provides digitization of encoded speech data prior to compression and transmission, and conversion of received and expanded speech dam to an analog speech signal intended for reproduction. For the present example it is assumed that a radio connection has been established in the state st1, in which the time slot pair 3, 15 is used for the transmission and reception, respectively, of digital speech data by a secondary station. The speech pointer SPP1, started by the Timing & Control stage 15, freely progresses along the speech buffer SB5 and the ADPCM stage reads the digital data pointed out by the speech pointer SPP1 from the speech buffer SB5 and converts the digital data into analog speech. When the speech pointer SPP1 reaches the end of the speech buffer SB5, it jumps back to the beginning thereof for repeated cyclic scanning of the speech buffer every 10 ms in DECT, that being the duration of a frame fr comprising 24 time slots. Therefore, the speech buffer SB5 is to be considered as a cyclic buffer containing 10 ms of speech. Each time a new speech burst arrives in the receiver 102, in the form of compressed digital speech in the time slot 15, the cyclic buffer SB5 is filled again. During filling of the speech buffer SB5, it is also read. The radio pointer RFP1, which controls the filling process, is positioned at a buffer location at the beginning of filling of the buffer SB5 such that after filling is completed the speech pointer SPP1 will be positioned exactly at the buffer location in which the first speech data of the new speech burst is stored. In DECT the duration of an information burst is 280 μs and in the read mode a buffer location corresponds to 10 ms/80=125 μs. Therefore, the duration of the filling process is equal to the duration of reading 280/125=2.24 buffer locations by the LF control stage 14. Therefore, filling should commence at 2.24 buffer locations from the speech pointer SPP1. For each time slot in a frame fr, the shift table ST in the data memory DM contains starting values for the radio pointer RFP1. There are 12 receiving time slots having a duration of 416.7 μs, i.e. the time slots are shifted 416.7/125=3.33 buffer locations (in nibbles) relative to one another. These shift values are also stored in the shift table ST. Prior to the starting of the pointers by the Timing & control stage 15, the Programmable Communication Controller PCC loads the radio pointer RFP1 in conformity with the shift value associated with the receiving time slot number, being the time slot number 15 in the present example. In a practical situation the starting values for the radio pointer RFP1 can be chosen so that for the first time slot 12 the radio pointer RFP1 is positioned two buffer locations further in the speech buffer SB5 than the speech pointer SPP1. For the time slot 15, the radio pointer RFP1 should then be positioned 3×3.33=10 buffer locations further than in the case of the time slot 12. For transmission via the corresponding time slot 3 in the time slot pair 3, 15, from the speech buffer SB1, similar shifts apply.

Subsequently, on the basis of signal strength measurements performed by the signal strength measuring stage 107, the receiver 102 detects that handover to a different time-slot/frequency-channel combination is desirable. After a customary scan to determine whether a free channel is available in which the receiving conditions are better, the Programmable Communication Controller PCC initiates a handover procedure in accordance with the invention. A primary station BS informs the relevant secondary station MS that a time slot pair 6, 18 is available and starts to transmit, in parallel with the transmission via the time slot pair 3, 15, digital speech from the same source via the time slot pair 6, 18, but shifted in time, the latter speech being referred to as copy speech data. Even though the copy speech data is transmitted via a different frequency channel in practical circumstances, for the sake of simplicity it is assumed in FIG. 3 that the copy data is transmitted via the same frequency channel. In FIG. 3 this transitional state is denoted by the reference fr, st2, speech data and copy speech data being represented by oppositely directed shading. In practice it will take a few frames fr before the copy speech data is validated, considering the customary handshaking between the relevant primary and secondary stations. Until the copy speech data is validated, it is stored in the dummy speech buffer SBD under the control of the radio pointer RFP2 which has been loaded by the Programmable Communication Controller, prior to the storage of copy data from the shift table, with the shift value associated with the time slot 18, i.e. 6×3.33=20 buffer locations relative to the shift value of the time slot 12. For Channel Set-Up, reference is made to pages 201-205 of said handbook by Tuttlebee. It is to be noted that DECT allows for radio communication of the same speech data via different time-slot/frequency-channel combinations during a multiframe comprising 16 frames.

The reference fr, st3 in FIG. 3 denotes the actual time slot handover. After the Programmable Communication Controller PCC has detected that the copy data is valid, a change-over is made to the time slot 18 upon reception of the next frame. The change-over from the time slot 15 to the time slot 18 is seamless in accordance with the invention. In the present example this is achieved by replacing the radio pointer RFP1 by the radio pointer RFF2 which has been shifted 10 buffer locations relative to RFP 1. The time difference in the reception relative to the beginning of the frame fr is thus compensated for, while the speech pointer SPP1 continues to scan the most recent speech samples, first a part of the "old" speech samples from the time slot 15 and subsequently the more recent speech samples from the time slot 18. In the case of a duplex speech connection via two time slots 3 and 6, transmission takes place in the direction of the secondary station until the handover process has been completed. When the handover process has been completed, denoted by the state fr, st4 in FIG. 3, the duplex connection then continues via the time slot pair 6, 18.

Figure 4:
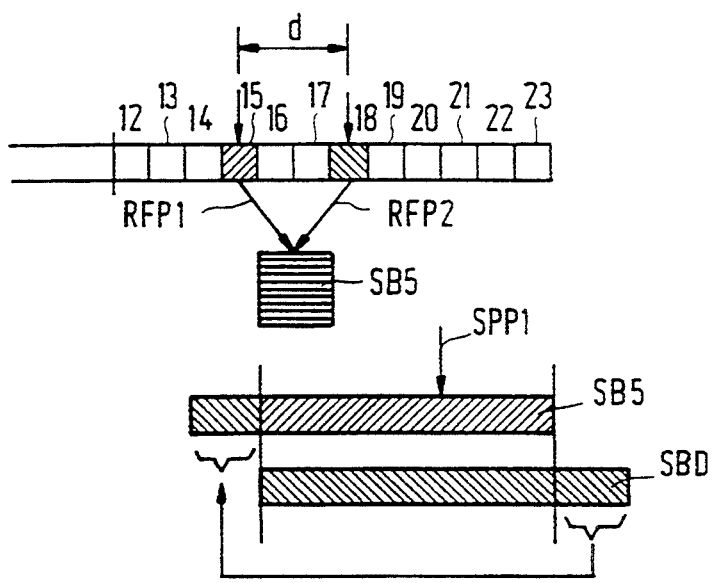
FIGS. 4, 5 and 6 illustrate the handover in accordance with the invention in greater detail.
Figure 5:
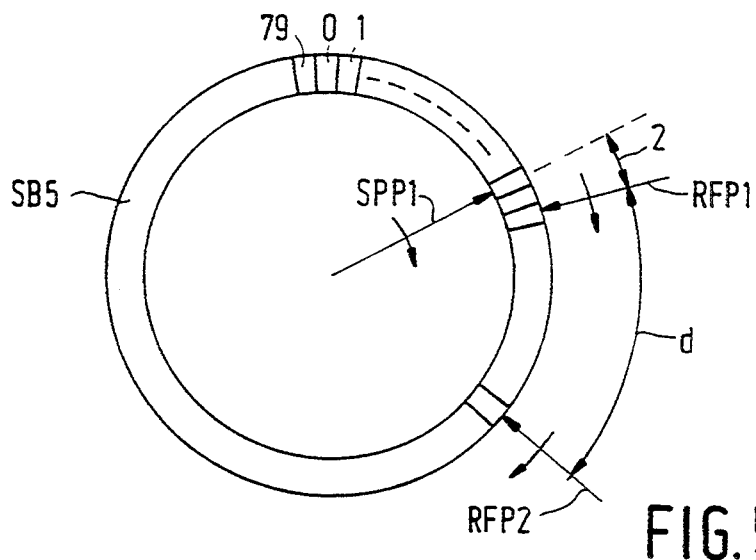
Figure 6:
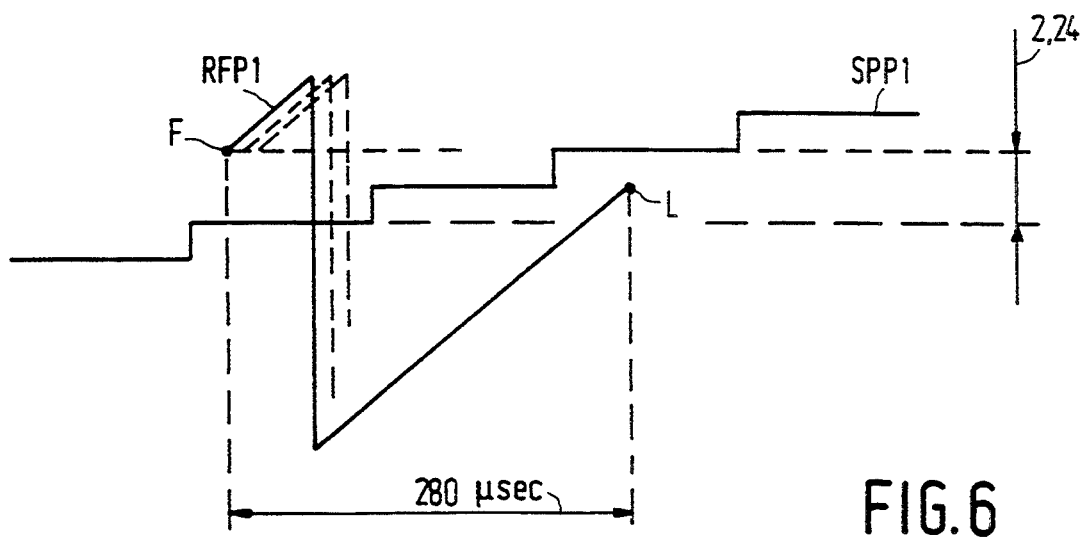

FIGS. 4, 5 and 6 show the handover in accordance with the invention in greater detail. These Figures show a situation during the state fr, st3 in FIG. 3 in which a time slot spacing d between the time slots 15 and 18 in terms of buffer locations of the buffer SB5 amounts to 10 buffer locations. The overlapping part of the buffers SB5 and SBD, having been shifted 10 buffer locations as if it were relative to one another, contains identical speech samples. FIG. 4 shows the buffers SB5 and SBD with the speech pointer SPP1. The non-overlapping part of the buffer SBD and the buffer SB5, denoted by a brace, contains the most recent non-overlapping speech data. The described handover procedure ensures that the speech pointer SPP1 always "sees" the most recent speech samples. FIG. 5 shows the buffer SB5 as a cyclic buffer having 80 buffer locations 0–79. During the radio connection via the time slot pair 3, 15, the speech pointer SPP1 follows the digital speech burst indicated by the radio pointer RFP1 which is replaced by RFP2 upon handover to the time slot pair 6, 18. In the present example, the distance between the speech pointer SPP1 and the radio pointer RFP1 amounts to 2.24 buffer locations (in a practical, discrete situation it amounts to 2 locations) and the distance between the radio pointers RFP1 and RFF2 amounts to 10 buffer locations, the situation shown referring to the beginning of writing of the speech burst.

In FIG. 6, showing the pointers SPP1 and RFP1 as quantities varying as a sawtooth, a correct situation of the speech pointer SPP1 relative to the radio pointer RFP1 is shown. The loading of a speech burst has a duration of 2.24 buffer positions in DECT. The pointers SPP1 and RFP1 are positioned relative to one another so that they do not overtake one another. Furthermore, a shading is used to indicate uncertainty in reading due to propagation time differences between a secondary station and various primary stations. Intra-cellular within DECT, where distances between primary and secondary stations amount to some 200 meters, the propagation time is negligibly small, but for other applications where greater distances need be bridged the propagation time may be of significance. Using the described delay time determining means, the propagation time can be determined and the radio pointer can be adapted accordingly.

We claim:

1. A digital radio system comprising a primary station and a secondary station and wherein a succession of data symbols is exchanged between said stations via one or more time/frequency multiplex slots in each of successive multiplex frames, each multiplex slot accommodating a plurality of successive data symbols; handover from a present multiplex slot to a substitute multiplex slot being effected by transmitting in said substitute multiplex slot a copy of the data symbols concurrently being transmitted in the present multiplex slot; characterized in that either or both of said primary and secondary station comprises:

- a cyclic buffer having a first series of storage locations for storing at least the data symbols accommodated in a multiplex slot, and a parallel series of storage locations for storing a copy of the data symbols stored in the first series of storage locations;
- a high frequency buffer control stage for generating a first pointer (RFP) for controlling writing of successive data symbols from a received multiplex slot into said first series of storage locations in said buffer at a relatively high rate, commencing at an initial storage location determined by said first pointer;
- a low frequency buffer control stage for generating a second pointer (SSP) for controlling reading from said buffer at a relatively low data rate the data symbols which have been stored therein by said first pointer, reading from said buffer of all of the data symbols derived from a presently received multiplex slot being completed by said second pointer by the time data symbols from a next succeeding frame of said multiplex slot are written into said buffer by said first pointer; and
- a programmable communications controller for controlling both of said buffer control stages to effect handover from a present multiplex slot to a substitute multiplex slot, said communication controller being programmed to:
  i) cause first pointer to change said initial location in said first series of storage locations to a substitute location in said first series, the substitute location being displaced from the initial location by a number of storage locations corresponding to the time interval between said present multiplex slot and said substitute multiplex slot;
  ii) provide a substitute for said first pointer which relates to said substitute storage location instead of to said initial storage location; and
  iii) control said second pointer to read the copy data symbols from said parallel series of storage locations in said buffer until said second pointer reaches a location in said parallel series of storage locations which corresponds to said substitute storage location in said first series of storage locations, and to then switch to reading subsequent data symbols from said first series of storage locations;

whereby handover from said present multiplex slot to said substitute multiplex slot is effected without any interruption of reading of data symbols by said second pointer.

2. A digital radio system as claimed in claim 1, wherein the data symbols represent compressed speech and said first pointer (RFP) is always positioned with respect to said buffer so as to store the most recently received compressed speech data therein.

3. A digital radio system as claimed in claim 2, wherein said second pointer (SSP) freely progresses along said buffer in order to read/write data therein.

4. A digital radio system as claimed in claim 1, wherein said primary station comprises delay-time detecting means for measuring propagation time of transmission from the primary station to the secondary station, and the secondary station determines positioning of said first pointer (RFP) with respect to said buffer so as to avoid phase shift due to the measured propagation time.

5. A digital radio system as claimed in claim 1, wherein said secondary station further comprises: signal strength measuring means for measuring signal strength of a received radio signal which is modulated with digital data symbols; and means including said programmable communications controller for performing a handover to replace, based on measured received radio signal strength, said present multiplex slot with said substitute multiplex slot.

6. A digital radio communication system as claimed in claim 1, wherein data symbols are exchanged between stations in a duplex mode via a pair of time slots in each multiplex frame, one slot of said pair being for transmission in one direction and the other slot of said pair being for transmission in the opposite direction.

7. A digital radio communication system as claimed in claim 1, wherein said system is a cordless telephone system in which the primary station is a base station and the secondary station is a cordless telephone set.

8. A digital radio system as claimed in claim 1, wherein said communications controller is comprised in said primary station.

9. A digital radio system as claimed in claim 1, wherein said communications controller is comprised in said secondary station.

* * * * *